March 15, 1938.   H. I. DYER ET AL   2,110,931
MACHINE TOOL
Filed Oct. 23, 1935   4 Sheets-Sheet 1
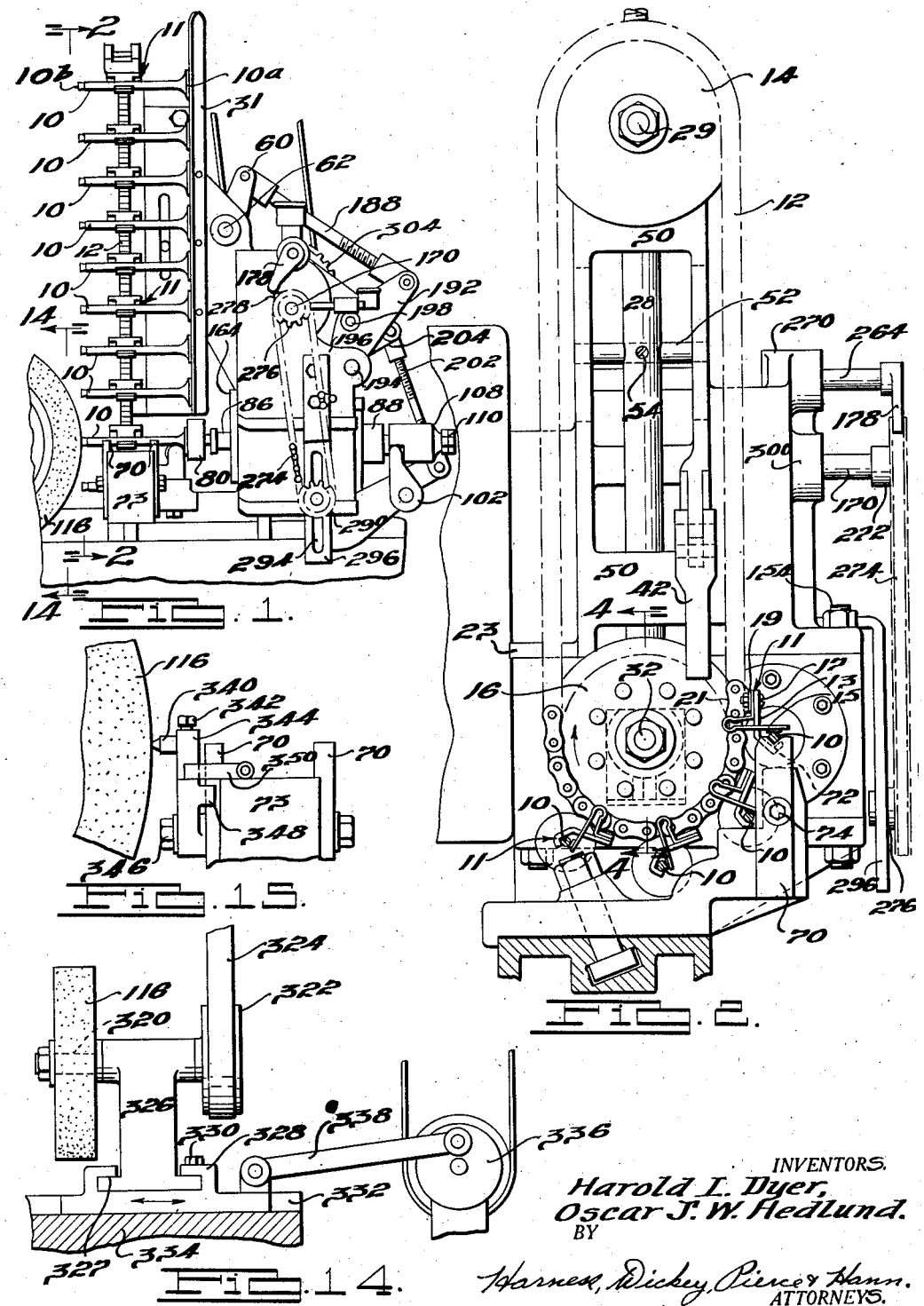

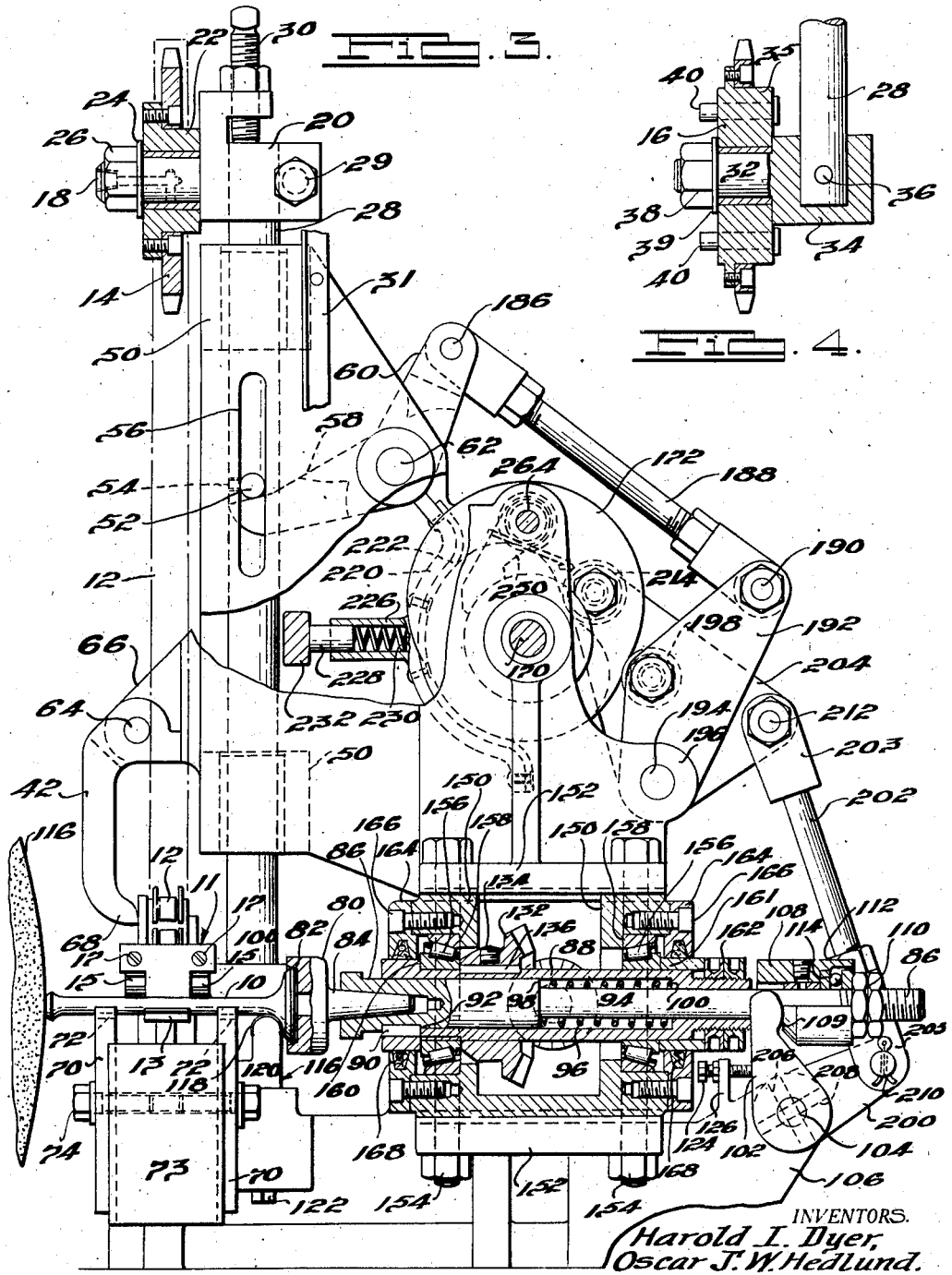

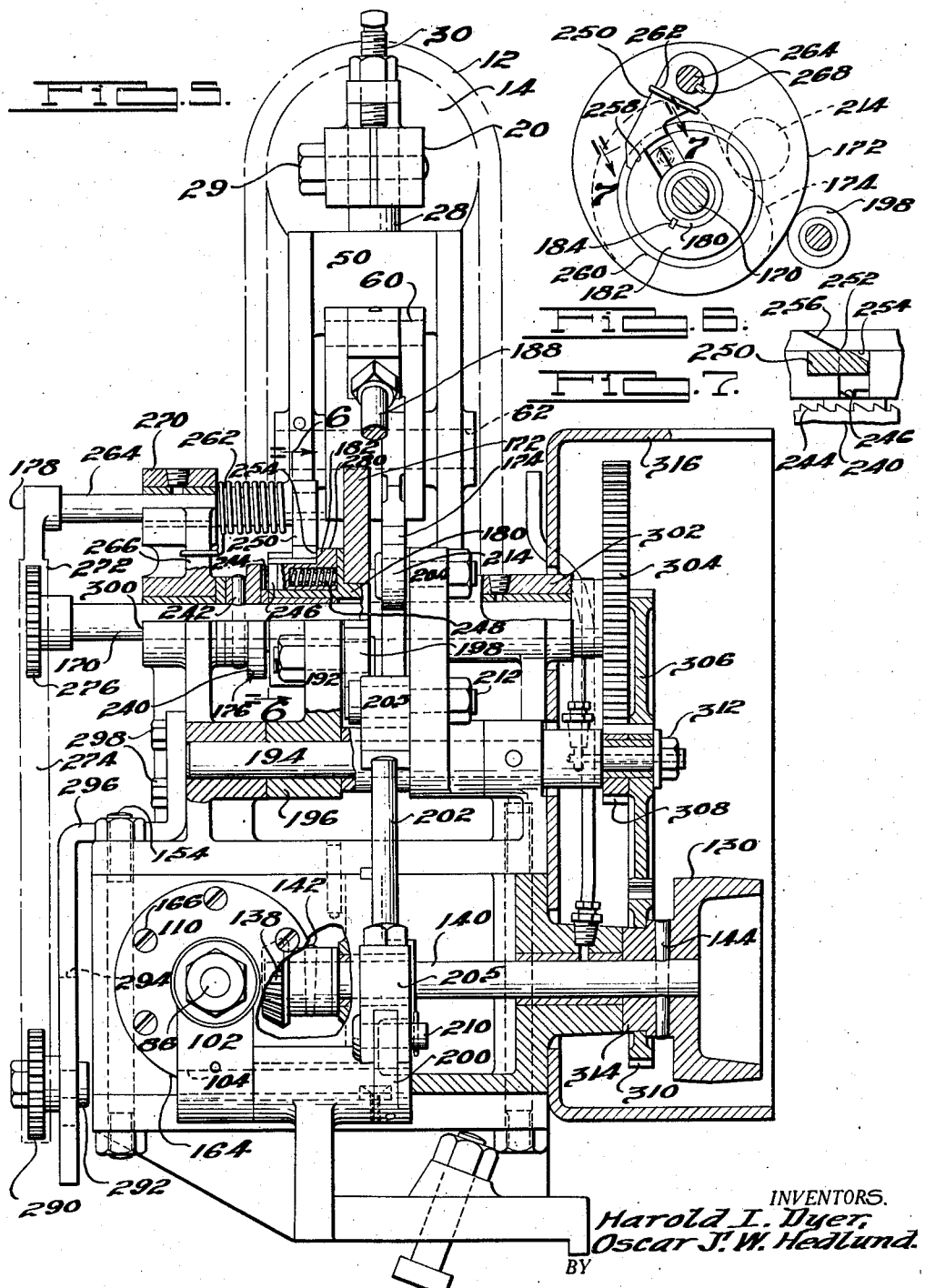

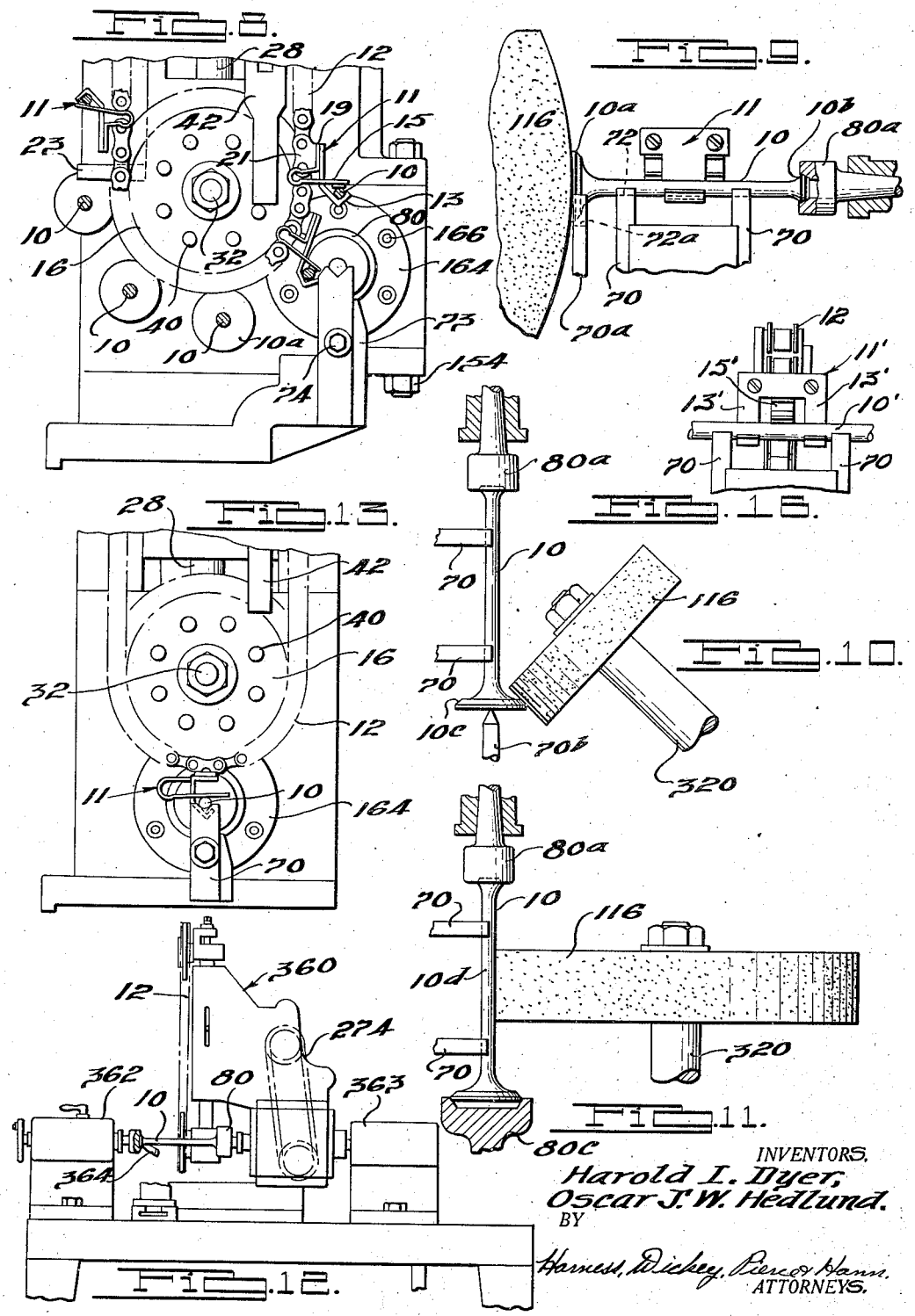

Patented Mar. 15, 1938

2,110,931

UNITED STATES PATENT OFFICE 2,110,931

MACHINE TOOL

Harold I. Dyer and Oscar J. W. Hedlund, Battle Creek, Mich., assignors, by mesne assignments, to Eaton Manufacturing Company, Cleveland, Ohio, a corporation of Ohio Application October 23, 1935, Serial No. 46,252

17 Claims. (Cl. 51—103)

The present invention relates generally to machine tools and more particularly to machine tools embodying automatic mechanism for feeding articles to working position, and for conveying completed articles away from such working position.

Objects of the present invention are to provide a machine tool, adaptable for grinding, machining or other operations, which is fully automatic in operation, relatively simple in construction, and in operation substantially reduces the cost of such operations.

Further objects of the present invention are to provide a machine tool embodying automatic means for successively presenting articles to be ground, machined, or otherwise operated upon to a working position and to successively convey the completed articles away from such working position; to provide such a machine tool in which the feeding mechanism operates in conjunction with chucking mechanism for the articles positioned at the working position; in which the chucking mechanism is movable to engage and release the articles; in which the feeding mechanism and the chucking mechanism operate in timed relation; and in which the chucking mechanism may be adjusted to predetermine the dimensions of the completed article.

Further objects of the present invention are to provide a machine tool for grinding, machining, or otherwise operating upon articles, in which the articles are loaded in a magazine, selectively movable to present the successive articles stored therein at a working position and to convey the articles away from such working position; in which the magazine is adapted for either manual or automatic loading, and for either manual or automatic unloading; and in which the articles are retained under the control of the magazine while at the working position.

Further objects of the present invention are to provide a machine tool of the above stated character in which the chucking mechanism is effective to resiliently urge the article into engagement with a grinding or abrasive element; and in which the chucking mechanism cooperates with stop mechanism effective to automatically terminate the grinding, machining or other operation when the dimensions of the article reach a desired value.

Further objects of the present invention are to provide a machine tool of the general character above stated in which the magazine feeding mechanism comprises an endless conveyor chain, unidirectionally driven; in which the articles are carried in a plurality of clips disposed around the conveyor chain; in which clips embody resiliently related elements, between which the articles may be snapped, either manually or automatically, and from which at the completion of a grinding, machining or other operation the articles may be removed either manually or automatically; and in which at the working position a resilient element of each clip acts to urge the article into engagement with the previously mentioned supporting mechanism.

Further objects of the present invention are to provide a machine tool of the above stated general character embodying an endless conveyor type magazine feeding device, and in which the working position is located at one of the curved portions of the path followed by the articles; in which the supporting mechanism is positioned in the path of the articles; in which the magazine is movable bodily with respect to the supporting mechanism to enable the articles to successively clear the supporting mechanism in being transferred from the working position to the discharge position; in which the magazine is reciprocable in a rectilinear path in timed relation to its notching movement so that, at the completion of a grinding, machining or other operation, the magazine moves bodily with reference to the supporting mechanism carrying the just finished article away from such support, and is then notched one step, carrying the just completed article beyond the range of the support and presenting the next article over the support, and in which the notching of the magazine is effected in response to its reciprocation.

Further objects of the present invention are to provide, in a machine tool of the above generally stated character, improved timing mechanism for timing the duration of each grinding, machining or other operation, and for automatically actuating the feed mechanism to remove a completed article and present a new article to the operating mechanism at the completion of such predetermined finishing.

Further objects of the present invention are to provide, in a machine tool of the above generally stated character, improved clutching mechanism responsive to the operation of the above stated timing mechanism, and adapted to control the mechanism for actuating the feeding mechanism in step by step manner and for actuating the supporting mechanism between work engaging and work released position.

With the above and other objects in view, which appear in the following description and in the appended claims, preferred embodiments of the present invention are illustrated in the accompanying drawings throughout the several views of which corresponding reference characters are used to designate corresponding parts and in which:

Figure 1 is a general view in side elevation of the improved machine tool;

Fig. 2 is an elevational view taken along the line 2—2 of Fig. 1;

Fig. 3 is a view in side elevation, partly in section and with certain of the parts broken away, of the structure shown in Fig. 1;

Fig. 4 is a fragmentary view in vertical section, taken along the line 4—4 of Fig. 2;

Fig. 5 is a view in rear elevation, with certain of the parts broken away, and partly in section, of the structure shown in Fig. 1;

Fig. 6 is a fragmentary detail view, taken along the line 6—6 of Fig. 5;

Fig. 7 is a fragmentary detail view, taken along the line 7—7 of Fig. 6;

Fig. 8 is a fragmentary view corresponding in general to Fig. 2, but illustrating the magazine in raised position;

Fig. 9 is a fragmentary view illustrating the application of the present invention to the grinding of the head of the valve;

Fig. 10 is a modified view illustrating the use of the present invention in grinding seats in the heads of valves;

Fig. 11 is a modified view illustrating the applicability of the present invention to the grinding of the stems of valves;

Fig. 12 is a modified view illustrating the use of the invention in conjunction with a machine lathe;

Fig. 13 is a view corresponding in general to Fig. 2 but illustrating a different positioning of the work supporting element with reference to the magazine;

Fig. 14 is a view taken along the line 14—14 of Fig. 1, illustrating a preferred method of reciprocating a grinding wheel during rotation thereof;

Fig. 15 is a partial view illustrating a dressing tool support adapted to be carried upon the work supporting element of the machine; and Fig. 16 is a view of a modified clip construction.

In its illustrated embodiment, the improved machine tool of the present invention is applied to the grinding and machining of valves, the several views illustrating the use of the machine in grinding the valve heads, the ends of the valve stems, the grinding of seats on the inner faces of the valve heads, and the machining and grinding of the valve stems. As will appear from a complete understanding of the present invention, however, the principles thereof may readily be embodied in machines specifically designed to perform other operations upon valves as well as to operate upon objects other than valves. The illustration of the present invention, accordingly, with reference to specific objects such as valves, is to be regarded in an illustrative and not in a limiting sense. While, as appears hereinafter, a single machine may be selectively used to perform each of the above operations, as well as others, thus providing a machine of great utility, it may be desirable under some production requirements, to use a battery of the machines, each machine being adapted to perform one individual operation upon a valve or other articles.

In the form illustrated, the present invention embodies generally a magazine adapted to be loaded with a plurality of valves and adapted to successively feed the valves to and from a working position; automatically controlled chucking mechanism positioned at the working position for receiving the valves fed thereto by the magazine and for supporting and rotating the valves in cooperative relation to a grinding wheel, lathe tool or other operating device; and timing mechanism for effecting, in timed relation, the feeding action of the magazine and the chucking and unchucking action of the chucking mechanism.

The magazine is illustrated as comprising an endless chain trained over spaced sprocket wheels, and being provided along its length with a plurality of springlike clips, each adapted to receive a valve. The valves may be inserted in the clips either manually or automatically. The magazine is disposed to be periodically notched, each notching action effecting movement of one clip and valve away from the working position and presenting the next clip and valve to the working position. The valves are retained within the clips at the working position, but, in certain instances, are there provided with additional bearing supports disposed in the path of travel of the valves and which cooperate with the above mentioned chucking mechanism. To enable the valves to clear the just mentioned bearing supports in being moved away from the working position, the magazine is disposed to be moved bodily to a position in which the path of travel of the valves does not include the bearing supports. This bodily movement is accompanied by the above mentioned notching movement of the magazine and a feature of the present invention resides in effecting the notching movement in response to the bodily movement. The notching movements of the magazine transfer the valves from working position to a discharge position, at which they are preferably removed from the clips by cam mechanism disposed in the path of travel of the valves.

The construction and disposition of the chucking and work supporting elements, at the working position, depend upon the character of the operation being performed upon the valves or other articles. In grinding the tappets of the valves, the valve head is supported and frictionally driven by the collet described below, the previously mentioned bearing standards are provided to support the valve stem, which is retained within the bearing standard by the magazine clips, and the tappet is presented to a grinding wheel supported adjacent the grinding position. In grinding the heads of the valves, the valve tappet is supported and frictionally driven by the collet, the bearing standards being arranged to support the valve stem. In this instance an additional bearing standard is preferably provided to support the valve head. In grinding the seating faces of the valve heads, the valve tappet is supported and frictionally driven by the collet and a cooperating dead center or additional collet is preferably provided to support the valve head. In this instance, the supporting standards for the stem may be dispensed with, if desired. Similarly, in grinding the valve stems or in applying the feeding and chucking structure to machine lathes, one end of the valve is preferably supported within the collet described below and the other end is either supported on a dead center or upon another collet.

In all of the above operations, the improved collet structure of the present invention is automatically adjusted between valve engaging and retracted positions, being moved to valve engaging position upon the notching of a valve to working position by the magazine and being automatically withdrawn to the retracted position, releasing the valve, at the termination of a predetermined grinding or machining period. The collet is provided with a loading spring through which it is continuously urged to the valve engaging position, and by which it is also gradually fed into the grinding wheel or other operating device. Stop mechanism arranged either to engage a portion of the valve or to operate directly upon the collet, is preferably provided to limit the feeding movement of the valve into the grinding wheel or other operating device, so that the machine may be accurately pre-set to provide a finished valve of desired dimensions.

The timing mechanism is illustrated as comprising a pair of cams, one of which is operatively connected to the magazine for reciprocating it, and the other of which is operatively connected to the collet to effect movement of it from the valve engaging to a retracted position. The cams normally are at rest and at predetermined timing intervals are given one complete revolution and again brought to rest. Preferably and as illustrated, a continuously acting brake is provided to insure that the cams and consequently the magazine and collet movements will be promptly interrupted.

The timing interval is determined by a sprocket chain of adjustable length carrying a cam adapted to engage a dog and move the latter. The movement of the dog actuates suitable clutch mechanism to clutch the previously mentioned cams to a source of power.

The machine also embodies a dressing fixture for the grinding wheel, which may be accurately positioned and adjusted with reference to the work engaging position of the collet, to thereby dress the grinding wheel to a predetermined spacing between the work engaging position of the collet and the grinding wheel surface.

*Magazine feeding mechanism*

Considering the magazine feeding elements in detail, and referring first to Figs. 1, 2, 3, 4 and 8, the tappet valves 10 to be ground are carried in clips 11 upon a magazine formed of an endless sprocket chain 12, which passes over upper and lower sprocket wheels 14 and 16.

Each clip 11 comprises a V-shaped finger 13, which supports the stem of the valve 10 and is positioned between a pair of springs 15, adapted to overlie and resiliently urge the valve 10 into engagement with finger 13. Finger 13 and springs 15 are suitably secured as by one or more studs 17 to the outwardly turned ends 19 of the specially formed links 21 of chain 12. It will be understood that the spacing between successive clips 11, along chain 12, depends upon the size of the objects to be supported within the clips. It will also be understood that a valve may be snapped into a clip 11 by pressing it between the outer ends of the finger 13 and the springs 15, which pressing separates springs 15 from finger 13 sufficiently far to permit insertion of the valve. If desired, suitable hopper mechanism may be provided to automatically load the clips 11 with valves 10. With the illustrated machine, however, the clips 11 are manually loaded, the loading occurring at either side of the magazine. A guide bar 31 is preferably provided to aid the operator in properly positioning the valves in the clips. Similarly, the unloading of the valves 10 from the clips 11 may occur either automatically or manually, the illustrated arrangement comprising bifurcated cam bar 23 (Fig. 2) extending into the path of the valves 10 on the discharge side of the machine. The two arms of cam 23 are positioned so that in the step by step movements of the conveyor chain 12, effected as later described, the finger 13 and springs 15 pass between them. Engagement of cam 23, however, with a valve 10 interrupts the movement of the latter and flexes the springs 15 sufficiently to release the valve 10 and permit it to freely fall into any suitable collecting means. An alternative clip construction is shown in Fig. 16, comprising spaced U-shaped fingers 13', and a single intermediate spring 15'. The modified clip 11' is secured to chain 12 in the same manner as the clip.

The upper sprocket wheel 14 is rotatable upon a stub shaft 18 which may be formed integrally with or suitably secured in forwardly extending relation to a collar 20. The inner end of the separately formed hub 22 of sprocket wheel 14 bears against the outer face of collar 20 and the outer face of hub 22 is engaged by a washer 24, retained in place on shaft 18 by a nut 26. Collar 20 fits over the upper end of a reciprocating rod or standard 28, and is preferably provided with an adjusting stud 30, the lower end of which abuts the upper end of standard 28. As will be understood, adjusting stud 30 is effective to adjust the axial position of collar 20 upon standard 28, and consequently to adjust the spacing between sprocket wheels 14 and 16.

The lower sprocket wheel 16 is similarly rotatably carried upon a shaft 32 formed integrally with or secured in forwardly extending relation to a boss 34. Boss 34 is suitably secured to the lower end of the standard 28 by pin 36. The rear face of the separately formed hub 35 of sprocket 16 abuts the boss 34, and the front face thereof is engaged by a washer 39 held in place on shaft 32 by nut 38. The hub 35 of sprocket 16 is also provided with a plurality of pins 40, arranged in a circle concentric with shaft 32 and which, as described later, cooperate with a pivotally carried dog 42 to notch the sprocket chain 12 around in step-by-step manner and, consequently, to successively feed the valves 10 to and from working position.

The standard 28 is slidably guided within bosses 50 50 which may form a part of the machine frame and, intermediate its ends, is provided with a transverse pin 52 secured in place therein by a set screw 54. The respective ends of pin 52 extend through guide slots 56 formed in the machine frame, thus preventing axial rotation of the standard 28, and are disposed for engagement by the bifurcated arm 58 of a bell crank 60, which is pivotally mounted within the machine frame upon a shaft 62. As described in more detail, under the sub-heading "Timing mechanism", bell crank 60 is periodically oscillated from the illustrated position through a predetermined angle and then returned to the illustrated position. This movement of bell crank 60 causes a corresponding movement of standard 28 and, consequently, of the entire magazine comprising the conveyor chain 12 and the sprocket wheels 14 and 16 from the lower position shown in Fig. 2 to the upper position shown in Fig. 8. This reciprocatory movement of the magazine is utilized in the illustrated embodiment to lift the particular valve 10 previously operated upon away from the work support and, also, to effect sufficient notching movement of the magazine to bring the next valve into the working position.

As best shown in Figs. 3 and 8, the previously mentioned dog 42 is pivotally supported by a pin 64, upon a bracket 66, either forming part of or suitably secured to the machine frame, and the lower and inwardly turned end 68 thereof extends over the face of the lower sprocket wheel 16 in the path of the previously mentioned pins 40. In operation, an upward movement of the magazine brings one of the pins 40 into engagement with the lower end 68 of dog 42. This engagement interrupts the upward movement of such pin and, accordingly, continued upward movement of the magazine results in rotation of the sprocket chain 12, the amount of rotation equalling the spacing between successive clips 11. During the rotative movement, a pin 40, on wheel 16, adjacent the one engaging the dog 42, moves around to a position behind the dog, which, as shown in Fig. 3, is formed to permit such movement. When the magazine is lowered to the position illustrated in Fig. 3, such succeeding pin 40 engages the inner sloping surface of the lower end 68 of the dog 42 and cams the dog 42 in a clockwise direction, as viewed in Fig. 3, permitting such pin to pass below the lower end of dog 42 to a position in which it is effective to cooperate with dog 42 at the next reciprocation of the magazine. The spacing between pins 40, and the upward movement of the magazine, being uniform, it will be understood that uniform notching movements of the magazine are successively effected. If desired, braking or other mechanism may be provided to releasably retain the magazine in each notching position. In practice, it is found that the friction of chain 12 and wheels 14 and 16 is sufficient, however.

*Valve supporting and driving mechanism*

Referring further to Figs. 1, 2, 3 and 8, two similar, aligned standards 70, each provided at its upper end with a V-groove 72, are pivotally secured to the machine frame 73, by studs 74, adjacent the lower magazine sprocket 16, to form a bearing within which each valve 10 is supported during the grinding thereof. The vertical position of the standards with respect to the magazine is such that, with the parts in the grinding positions shown in Fig. 2, the finger 13 is spaced somewhat below the lower edges of the V-grooves 72 in standards 70, so that all of the support for a valve is provided by the standards 70, and the spring 15 is flexed upwardly somewhat from its normal position and continuously urges the valve 10 into the V-grooves 72. In the upper position of the magazine, shown in Fig. 8, the standards 72 are out of the path of travel of the clips 11, so that, during the rotation of the magazine which, as previously described, occurs as an incident to the movement thereof to the upper position, a clip 11 and valve 10 previously located at the working position, are moved to a position below and to one side of the standard 70, and the next succeeding clip 11 and valve 10 are moved to a position from which, during the return and downward movement of the magazine, they are brought into engagement with the standards 70.

The mechanism for securing the valves 10 in correct axial position at the working position and for rotating them, comprises a chuck or collet 80, the outer face of which is suitably recessed at 82 to receive and provide a frictional drive for the head 10a of a valve 10. The tapered shank 84 of collet 80 is conventionally fitted into the outer end of a drive shaft 86. Shaft 86 is slidably supported within a sleeve 88, but is secured against rotation with respect to sleeve 88 by a key 90 secured in shaft 86, and disposed to ride in an elongated slot or keyway 92 formed in sleeve 88. Shaft 86 is provided with a reduced portion 94, over which a compression spring 96 is placed, one end of which bears against the shoulder 98 and the other end of which bears against the inwardly extending shoulder 100 formed near the right hand end of sleeve 88. Spring 96 is continually under compression, and urges shaft 86 and collet 80 to the left into position to engage the head of a valve 10.

The upper end of a cam arm 102 bears against the inner face of a recess 109 formed in a collar 108, which is adjustably fixed axially of shaft 86 by the lock nuts 110. Lock nuts 110 bear against the outer ring 112 of a ball bearing unit 114, the inner ring of which is received within a recess within the collar 108. As described more in detail under the sub-heading "Timing mechanism", cam arm 102 is intermittently given a pivotal movement in a clockwise direction from the position illustrated in Fig. 3 through a predetermined angle, and then returned to the illustrated position. In so moving, cam arm 102 carries with it shaft 86 and collet 80, moving the latter elements to the right out of engagement with the valve 10 previously in working position, and out of the path of movement of the next valve 10 to be moved to working position, and then permits a return movement of collet 80 and shaft 86 under the influence of spring 96. The movement of shaft 86 and collet 80 to retracted position immediately precedes the previously described reciprocation and rotation of the magazine, and the return of collet 80 to valve engaging position immediately follows the return of the magazine to the lower position.

In certain instances, it is found satisfactory to permit the limit of the return movement of shaft 86 and collet 80 to be determined by the engagement between shoulder 109 and cam arm 102 and, as stated above, collar 108 is adjustably positioned upon shaft 86 to facilitate this. Preferably, however, additional stop mechanism is provided to accurately determine the minimum spacing between the surface of the abrading wheel 116, described hereinafter, and the collet 80, so that the machine may be accurately pre-set to grind the valves to selected final lengths. Where, as shown in Fig. 3, the tappet of the valve is being operated upon, the valve head is found to provide a convenient element to be engaged by this additional stop mechanism. As shown in Fig. 3, the stop fixture 116 comprises a pair of spaced rollers 118, adjustably mounted upon a bracket 120, which may be adjustably secured to the machine frame in any suitable manner, as by the stud 122, which passes through an elongate slot in the machine frame. The rollers 118 bear directly against the underside of the head 10a of valve 10, and thus afford a positive limit to movement thereof to the left as viewed in Fig. 3. The spacing between rollers 118 and wheel 116, being conveniently adjustable, it will be evident that the machine may readily be set to provide a desired final length of valve 10. When shaft 86 and collet 80 are moved into engagement with the head of valve 10 at the beginning of a grinding operation, the excess length of valve 10 prevents engagement between the valve head and the rollers 118. As the grinding progresses, however, during which valve 10 is continuously urged into engagement with grinding wheel 116 by the compression spring 96, the valve head gradually approaches the rollers 118, and upon engagement therebetween, a further feed of valve 10 into the grinding wheel is prevented and the grinding action is automatically interrupted.

In certain uses of the improved machine of the present invention, as described in detail hereinafter, the article being operated upon does not present a surface against which the stop mechanism 116 may readily act and for this reason it is considered desirable to provide the machine with additional stop mechanism which may act directly upon the shaft 86 and the collet 80. In Fig. 3, this additional stop mechanism comprises the adjusting stud 124, threaded into a boss 126 which extends upwardly from the previously mentioned bracket 106. The end of stud 124 bears against the cam arm 102, and thus provides a limit to its motion in a counter-clockwise direction as viewed in Fig. 3. Thus arm 102 through its engagement with shoulder 109 of collar 108 provides a positive and accurately adjustable limit to the movement to the left of shaft 86 and collet 80.

During the grinding action, the rotation of the abrasive wheel 116 is preferably accompanied by a corresponding rotation of the valve 10, and for this purpose the previously mentioned outer sleeve 88 to which shaft 86 is keyed, is connected to an external source of power represented by the pulley 130 (Fig. 5) through a bevel gear 132 secured upon sleeve 88 by set screw 134 and key 136, and a corresponding bevel gear 138 secured upon shaft 140 by the lock pin 142. As appears clearly in Fig. 5, shaft 140 carries the drive pulley 130 and is directly driven thereby through the lock pin 144.

Sleeve 88 and shaft 86 are suitably supported between generally rectangular housing members 150 disposed in suitably spaced relation and secured between upper and lower frame brackets 152 by the studs 154. Preferably and as illustrated, roller bearing units 156 of the combined radial and thrust type are interposed between the housing members 150 and sleeve 88. The outer rings of the roller bearing units 156 are radially and axially fixed with respect to the associated housing members 150 by being fitted within the recesses 158 formed in the outer faces of the latter. The inner ring of the left hand roller bearing unit as viewed in Fig. 3, abuts a shoulder 160 formed in sleeve 88. The inner ring of the right hand roller bearing unit abuts a stop collar 161 which is secured upon sleeve 88 by the lock nuts 162. The ends of the housing are closed by end plates 164 which are secured upon the outer faces of the housing members 150 by studs 166. Packing glands 168 are preferably interposed between sleeve 88, collar 161 and the end plates 164 to prevent the escape of lubricant from the housing.

As an alternative to positioning the work supporting standards 70, collet 80 and associated parts at the side of the magazine feeding mechanism, as described in detail above, the modified arrangement of Fig. 13 may be used, in which the standards 70, collet 80 and associated parts are positioned immediately below the axes of the upper and lower magazine driving sprockets 14 and 16. In all other respects, the construction, as well as the operation may be as described above.

Timing mechanism

Considering now the mechanism for releasing the completed valves from the collet 80, and for intermittently actuating the magazine to effect the removal from the work supporting standards of a completed valve and to notch the magazine around the distance between adjacent valve supporting clips, and referring particularly to Figs. 1, 3 and 5, the mechanism comprises generally a continuously driven shaft 170, a magazine cam 172, a collet cam 174, a clutch designated generally as 176 for clutching cams 172 and 174 to the shaft 170, and timing mechanism comprising a dog 178 for intermittently actuating clutch 176.

The magazine cam 172 and the collet cam 174 are both press fitted upon a sleeve 180, within which the shaft 170 is freely rotatable, and which is axially slidable within the movable member 182 of clutch 176. Rotation between sleeve 180 and clutch member 182 is prevented by key 184 (Fig. 6). The previously mentioned magazine actuating bell crank 60 is pivotally connected by a pin 186 to one end of a link 188 of adjustable length, the other end of which is pivotally connected by pin 190 to one end of a cam arm 192. The other end of cam arm 192 is pivotally carried by an idler shaft 194, journaled in a bracket 196 which may comprise a portion of the machine frame, and intermediate its end is provided with a roller 198 the surface of which rides upon the surface of the magazine cam 172. The parts are shown in the positions occupied during periods of rest and cam 172 is preferably so shaped that, during the course of a complete revolution of the latter, the magazine is moved at substantially constant speed from the position illustrated in Fig. 3 to the upper position illustrated in Fig. 8, and is then returned at susbtantially constant speed to the lower position illustrated in Fig. 3.

The previously mentioned cam arm 102 connected to the shaft 86 and collet 80, is disposed for actuation by the generally heart-shaped collet cam 174 through crank arms 200 and 202 and the cam arm 204. Crank arm 200 is secured by pin 206 to the shaft 104, to which cam arm 102 is also secured by pin 208. The other end of crank arm 200 is pivotally connected by pin 210 to the lower end of the arm 202. The upper end of arm 202 in turn is pivotally connected by pin 212 to the cam arm 204. Cam arm 204 is pivotally supported upon the previously mentioned idler shaft 194 and rotatably carries a roller 214 which rides upon the surface of the collet cam 174. As will be evident, a complete revolution of collet cam 174 from the illustrated and normal position thereof results in an outward and inward swinging of cam arm 204, which is transmitted through links 202 and 200 to the cam arm 102. Cam arm 102, as previously described, withdraws collet 80 from the illustrated working position to a free position out of range of the magazine, and then permits collet 80 to be returned to the work engaging position by the compression spring 96.

To insure that the cams 172 and 174 and, consequently, the magazine and collet 80 will be brought promptly to rest at the completion of each intermittent movement thereof, a continuously acting brake 220 is preferably provided, and is illustrated as being pivotally supported upon the previously mentioned pivot pin 62, and provided with a conventional shoe 222 which bears upon the face of the collet cam 174. The outer face of brake 220 is provided with a cored-out extension 226 which slidably receives a pin 228 and a compression spring 230. The outer end of pin 228 bears against a fixed stop 232 which may form a part of the main machine frame, and, through spring 230, continually biases brake 220 into engagement with cam 174. The braking force imposed on cam 174 is transmitted to cam 172, since both cams 172 and 174 are press fitted upon the same sleeve 180, as previously mentioned.

The fixed member 240 of clutch 176 is secured upon the continuously rotating shaft 170 by the locking pin 242, and thus rotates continually therewith. The right hand face of clutch member 240, as viewed in Fig. 5, is provided with ratchet teeth 244, which cooperate with corresponding ratchet teeth 246 formed on the left hand face of the clutch member 182. One end of a compression spring 248, which is received in a recess formed in the clutch member 182, bears against the end of such recess, and the other end thereof bears against the outer face of the previously mentioned sleeve 180. Spring 248, thus continuously urges clutch member 182 into clutching relation with the fixed clutch member 240. Clutch member 182 is retained, during periods of rest of the magazine and of the collet, in the position illustrated in Fig. 5, out of engagement with the fixed member 240, by a dog 250, one face 252 of which normally abuts a cam shoulder 254 formed on the outer surface of the clutch member 182. The cam shoulder 254 is provided with an axially angled portion 256. Normally, the lower face 258 of dog 250 is supported upon the outer surface 260 of the clip member 182, and is biased to this position by a coil spring 262 which surrounds the dog shaft 264, and the opposite ends of which are wrapped around the machine frame portion 266 and dog 250 respectively. Dog 250 is non-rotatably secured with respect to shaft 264 by a key 268. The dog shaft 264 is journalled in a frame boss 270.

The previously mentioned timing dog 178 is suitably supported upon the outwardly extending end of dog shaft 264, and the lower end thereof is continuously urged, by spring 262, into the path of a cam 278 (Fig. 1), formed on a sprocket chain 274 which passes over a timing wheel 272, cooperating with sprocket teeth 276 formed on the periphery thereof. Wheel 272 is continuously driven through the main drive shaft 170. At successive, equal intervals, accordingly, determined by the rate of rotation of shaft 170 and the length of chain 274, cam 278 engages the lower end of dog 178, and rotates the latter in a clockwise direction, as viewed in Fig. 1. This rotation of dog 178 is transmitted through shaft 264 and causes a corresponding pivoting of the clutch dog 250, swinging the latter in a clockwise direction (Fig. 6) away from the surface of the clutch member 182, and releasing the latter. Upon being released, clutch member 182 moves to the left, as viewed in Fig. 5, under the influence of the compression spring 248, bringing the clutch teeth 246 thereof into clutching relation with the clutch teeth 244 formed on the fixed clutch member 240. As will be evident, this action completes a driving connection between shaft 170 and the cams 172 and 174, in response to which the latter rotate.

The engagement between the chain cam 278 and the timing dog 178 is momentary only, but continues long enough to complete the above driving connection. Upon the release of the clutch dog 250, which occurs when chain cam 278 passes beyond dog 178, dog 250 moves back into engagement with clutch member 182. At this time, however, the raised cam portion 256 of clutch member 182 is aligned with dog 250 so that the return movement of the latter is ineffective to unclutch the clutch members 240 and 182. As the rotation of the latter members continues, however, the axially angled portion 256 of the cam shoulder 254 engages dog 250 and continued movement of the former gradually cams clutch member 182 to the right as viewed in Fig. 5. The relation of the parts is such that at or about the time a complete revolution of the magazine and collet cams 172 and 174 is completed, the rightward camming movement of clutch member 182 effects a release between clutch members 182 and 240, thus interrupting the driving connection for cams 172 and 174 and resulting in the stopping, accordingly, of the movement of the magazine, and the axial movement of collet 80. At the time of such unclutching, dog 250 is again in engagement with the flat portion of the cam shoulder 254 formed on the clutch member 182, and the parts are thus in the position occupied by them prior to the clutching action.

As will be understood, the timing period provided by the timing chain 274 may be varied in different ways, as, for example, by using a plurality of strikers 278 in spaced relation. Preferably, however, this is accomplished by varying the length thereof, by removing or adding links, and by making corresponding adjustments of the lower sprocket wheel 290 provided for timing chain 274. The lower sprocket wheel 290 is rotatably carried upon a stub shaft 292, the position of which is adjustable upwardly and downwardly within an elongated slot 294 formed in a supporting bracket 296. As illustrated, bracket 296 is secured to the main machine frame by studs 298.

The main drive shaft 170 is suitably journalled within bosses 300 and 302 which may form a part of the main machine frame, and is connected to the previously mentioned external source of power comprising the pulley 130 through a reduction gear unit comprising gears 304 and 306, and pinions 308 and 310. Gear 304 is suitably secured to the outer or driving end of shaft 170, and mates with the pinion 308. Pinion 308 and gear 306, are suitably keyed to the previously identified idler shaft 194, and are removably secured in place thereon by the nut 312. Gear 306 mates with and is driven by the pinion 310, which is suitably secured, as by being press fitted over the hub 314 thereof, to the main drive pulley 130. Preferably, and as illustrated, a protective enclosure 316 is provided for the gear reduction unit and the drive pulley 130.

*Abrasive wheel supporting mechanism*

Referring particularly to Figure 14 and generally to Figures 1 and 3, the previously mentioned abrasive wheel 116 is carried upon and rotated by a shaft 320 which is driven through a drive pulley 322, which may be connected by belting 324 to any suitable external source of power. Shaft 320 is journaled within a bracket 326, which is adjustable transversely in ways 327 of a bed plate 328 and may be locked therein by one or more studs 330. Bed plate 328 is guided within ways 332 formed in a stationary part 334 of the machine and is connected for reciprocatory motion to a continuously driven member 336 through a pitman 338. During the rotation of grinding wheel 116, accordingly, a reciprocating motion is given it, to the right and left as viewed in Figure 14, which reciprocatory motion moves it back and forth across the face of the article being ground, thus making more uniform the wear upon the face of the abrasive wheel and introducing an additional component of grinding motion between the wheel surface and the object. As will be understood, the source of power to which the driving belt 324 for wheel 116 is connected may be arranged in various well known ways to absorb the reciprocatory movement of wheel 116.

*General Operation*

Considering the operation as a whole of the embodiment shown in Figs. 1 through 8 it will be understood that in preparing the machine tool for operation, the grinding wheel 116 is suitably adjusted within its bed plate 328 to provide a desired spacing between the surface thereof and between the inner or work engaging position of collet 80 as determined by the stop fixture 116, or by the stop fixture comprising the locking stud 124. It will also be understood that the clips 11 may be loaded with valves 10 either before or after the tool is placed in operation. Similarly, the rotation and reciprocation of grinding wheel 116 may be initiated either before or after the application of power to the main machine tool driving pulley 130.

Upon the starting of drive pulley 130 continuous rotation is imparted to the main shaft 170 and timing chain 274, as well as to the collet shaft 86 and collet 80. At regular intervals, determined by the rate of rotation of timing shaft 170, and upon the length of timing chain 274, timing cam 278 engages and actuates the timing dog 178 and the clutch dog 250. Clutch dog 250 upon being actuated, releases the movable clutch member 182, which thereupon moves into clutching engagement with the fixed clutch member 240 and connects the magazine cam 172 and the collet cam 174 to shaft 170. The consequent rotation of magazine cam 172 moves the valve magazine upwardly from the initial lower position to a higher position and then returns it to the lower position. During this movement, which lifts a completed valve 10 from the work supporting standards 70, the magazine chain is notched around one step by the engagement of the dog 42 by one of the pins 40, carried by sprocket wheel 16, thus carrying said completed valve away from the working position and moving the next valve into such working position. The rotation of collet cam 174 actuates the cam arm 102 to withdraw collet 80 from the valve engaging position to a retracted position, and this retracting movement is begun and progresses sufficiently far to disengage collet 80 from a completed valve 10 just prior to the beginning of the reciprocatory movement of the magazine. Thus, the completed valve is released by the collet prior to the initiation of its transfer away from the working position. The configuration of the collet cam 74 is such that collet 80 is not restored to the work engaging position until after the succeeding valve has been positioned in the working position by the return movement of the magazine. Thus, a valve is first moved to working position by the magazine, and then is engaged and started in rotation by the collet.

As illustrated, the grinding wheel 116 and the collet 80 remain in rotation throughout the transfer of valves so that the grinding action on the new valve is initiated as soon as collet 80 resumes the work engaging position. Throughout the grinding action, collet 80 is continuously urged to valve engaging position by spring 96 and thus acts to automatically feed the valve into the grinding wheel. When the head of valve 10 engages the stop fixture 116, or alternatively, when the cam arm 102 engages the stop stud 124, further feeding movement of collet 80 and consequently of valve 10, is prevented and the grinding operation is automatically terminated. It will be understood that the timing interval as determined by timing chain 274 is set to permit completion of the grinding operation within the timing period.

As the completed valves are successively conveyed away from the working position by the successive notching movements of the magazine, they successively engage the unloading cam 23 and are thereby discharged from the clips 11 and may be collected in any suitable manner.

*Modified grinding positions—Figures 9, 10 and 11*

In the figures described in detail above, the valves 10 are disposed to have their tappets ground, and the valve heads are received within the collet 80. The improved machine of the present invention, however, may also be used for grinding operations upon parts of the valves other than the heads, and also upon objects other than valves. Referring particularly to Figures 9, 10 and 11, arrangements for performing grinding operations upon valves other than upon the valve tappets, are illustrated.

In Figure 9, a valve 10 is disposed in reverse position upon the supporting standards 70, the valve head 10a being presented to the grinding wheel 116, and the valve tappet 10b being received within the collet 80a. Collet 80a may correspond in all respects to the previously described collet 80 and be correspondingly controlled, with the exception that the face recess is smaller. For grinding the head 10a of valve 10, an auxiliary supporting standard 70a is preferably provided having a V groove 72a corresponding to the previously described V-grooves 72, and disposed directly under the head 10a. As will be understood, standard 70a may be supported upon the machine frame in the manner previously described with reference to standards 70.

In Figure 10, the grinding wheel 116 is disposed to grind the seating face 10c of a valve 10, and in this instance, supplementary support for the valve 10 is preferably provided by the dead center 70b which is suitably supported in axial alignment with the collet 80a. In all other respects the operation and construction of the unit may be as described in connection with the first embodiment.

In Figure 11 the grinding wheel 116 is disposed to grind the surface of the valve stem 10d, and in this instance it will be understood that the reciprocatory movement of wheel 116 as previously described, serves to extend the grinding action throughout a desired portion of the length of the stem 10d. As an alternative to the use of the dead center 70b described with reference to Figure 10, to provide auxiliary supports for valves 10, an additional collet 80c, corresponding in all respects to the previously described collet 80, may be suitably and rotatably supported in axial alignment with collet 80a.

*Adaptation to machine lathes—Figure 12*

Figure 12 illustrates a further adaptation of the magazine feeding device of the present invention, in this instance to a machine lathe. Referring to Figure 12, the magazine feeding device designated generally at 360 may correspond in all respects to the first described embodiment insofar as concerns the magazine feeding device comprising the endless conveyor 12, the timing mechanism comprising the timing chain 274, and the mechanism for effecting rotation and axial movement of collet 80. In this instance, however, the previously described side drive for collet 80 is replaced by an axial drive. The collet shaft 86a is driven by a conventional lathe head stock, to which it may be suitably splined. A conventional tail stock 362 is provided to support the other end of the valve. An illustrative lathe tool is illustrated at 364.

In operation, the magazine and collet control mechanisms operate as before, the magazine successively feeding valves to the working position and conveying valves away from the working position. Upon the arrival of the valves at the working position, the collet is automatically moved to engage the head of the valve and secure it between the collet and the corresponding tail stock 362. At the expiration of a predetermined period of machining, as determined by the timing mechanism, the collet is automatically withdrawn from the end of the work piece, thus releasing the latter from the tail stock 362, and permitting it to be conveyed away to the discharge position by the magazine. It will be understood that the lathe tool 364 may be either manually or automatically withdrawn from the work piece during the transfer of work pieces.

Dressing fixture—Fig. 15

A further feature of the present invention is the provision of a dressing fixture for the abrasive wheel, which may either be carried by the main machine frame, or selectively secured to it, in accurately adjustable spaced relation to the valve-supporting collet 80, so that, at the completion of a dressing operation, the spacing between the surface of the grinding wheel and collet 80 is of a desired value. Referring particularly to Figure 15, a conventional diamond dressing tool 340 is adjustably secured by a stud 342 within a fixture 344 which may be pivotally secured by a stud 346 to the previously described frame portion 73, which also supports the work supporting standard 70. Fixture 344 is preferably provided with a boss 348, which engages either the machine frame or one of the standards 70, and limits movement of fixture 344 in one direction. A locking arm 350 is pivotally secured to the frame portion 73, and may be moved to the illustrated position, in which it locks the fixture 344 in the dressing position. During normal operation, fixture 344 may hang from the pin 346 and may be released to such position by swinging the locking arm 350 about its pivot out of the path of the fixture. It will be evident, that the spacing between the end of the dressing tool 340 and the collet 80 may be accurately adjusted through the adjusting and locking stud 342, so that, at the completion of a dressing operation, a correspondingly accurate spacing is provided between the collet 80 and the abrasive wheel 116. As will be understood, abrasive wheel 116 may be gradually fed into the dressing tool 340, by releasing the locking stud 330 therefor (Figure 14), and sliding the supporting standard 326 within the ways 327 of bed plate 328.

It will be evident from the foregoing that the present invention provides a highly efficient and fully automatic machine tool, adapted to materially increase the rate and accuracy with which valves or other articles may either be ground or machined or otherwise operated upon. It will also be evident that, although specific embodiments have been described in detail, various modifications may be made in the form, number and arrangement of parts within the spirit and scope of the present invention.

We claim:

1. In a machine tool, the combination of a magazine for supporting a plurality of articles and successively actuable to feed said articles to and away from a working position, chucking mechanism located at said working position and adapted to support an article in cooperative relation to a tool, means for effecting relative bodily movement between said magazine and said chucking mechanism in conveying an article away from working position, and means for actuating said chucking mechanism to release an article prior and in timed relation to said relative bodily movement.

2. In a machine tool, the combination of a magazine for supporting a plurality of articles and successively actuable to feed said articles to a working position and to convey said articles away from said working position, chucking mechanism located at said working position and adapted to support an article in cooperative relation to a tool, means for effecting a bodily movement of said magazine in conveying an article away from said working position, and means operating in timed relation and prior to said bodily moving means for actuating said chucking mechanism to release an article.

3. In a grinding machine, the combination of a magazine for supporting a plurality of articles, means for successively actuating said magazine to feed said articles to and away from a working position, chucking mechanism disposed at said working position and adapted to support said articles in cooperative relation to a grinding wheel, means for effecting a bodily movement of said magazine relative to said chucking mechanism in conveying said articles away from working position, and means operable prior and in timed relation to said bodily movement means for actuating said chucking mechanism to release an article.

4. In a machine tool, the combination of a magazine for supporting articles; means for actuating said magazine in step-by-step manner to successively feed articles to and away from a working position; chucking mechanism positioned at said working position and adapted to support said articles in cooperative relation to a tool; means for effecting a bodily movement of said magazine as an incident to the conveying of articles away from working position; and means operable in timed relation and prior to said bodily movement means for actuating said chucking mechanism to release an article.

5. In a machine tool, the combination of a magazine for supporting articles, comprising an endless conveyor element; means for reciprocating and indexing said magazine to successively feed articles to and away from a working position; chucking mechanism located at said working position and adapted to support an article in cooperative relation to a tool, and means operable in timed relation to and prior to said magazine moving means for actuating said chucking mechanism to release an article.

6. In a machine tool, the combination of a magazine for supporting a plurality of articles comprising an endless conveyor element trained over spaced rotary elements; means for bodily moving said magazine and for indexing said rotary elements to successively feed articles to and away from a working position; chucking mechanism located at said working position and adapted to engage an article and support it in cooperative relation to a tool; and means operable in timed relation to and prior to said magazine control means for actuating said chucking mechanism to disengage an article.

7. In a machine tool, the combination of a magazine for supporting a plurality of articles, comprising an endless conveyor element trained over spaced rotary elements; magazine moving means for periodically reciprocating said magazine and for indexing said rotary elements to successively feed articles to and away from working position; chucking mechanism located at said working position and effective to engage an article and support and rotate it in cooperative relation to a tool; and means operable in timed relation and prior to said magazine control means for rendering said chucking mechanism ineffective.

8. In a machine tool, the combination of a magazine for supporting a plurality of articles; means for moving said magazine to successively feed articles to and away from a working position; chucking mechanism at said working position; a bearing located at said working position and adapted to cooperate with said chucking mechanism to support an article in working position; and means for effecting relative bodily movement between said magazine and said bearing to remove said bearing from the path of movement of said articles.

9. In a machine tool, the combination of a magazine for supporting a plurality of articles and for successively feeding said articles to and away from a working position; chucking mechanism at said working position; a bearing located at said working position and adapted to cooperate with said chucking mechanism to provide support for said articles thereat, and means for effecting relative bodily movement between said magazine and said support to remove said support from the feed path of said articles.

10. In a machine tool, a magazine for carrying and successively feeding articles to a working position comprising in combination an endless article carrying member, spaced rotary members for carrying said endless member, and means for actuating said magazine to feed said articles comprising means for moving said magazine bodily and for rotating said rotary members.

11. In a machine tool, a magazine for carrying and successively feeding articles to a working position comprising in combination an endless article carrying member, spaced rotary members for carrying said endless member, means for moving said magazine bodily, and means responsive to said bodily movement for rotating said rotary members to advance said magazine.

12. In a machine tool, a magazine for carrying and successively feeding articles to a working position comprising in combination an endless article carrying member, spaced rotary members for carrying said endless member, means for moving said magazine bodily, and pawl and ratchet mechanism including an element carried by one of said rotary members for rotating said rotary members in response to said bodily movement.

13. In a machine tool, the combination of a feed magazine for feeding articles successively to a working position; chucking mechanism at said working position for receiving said articles, and means for actuating said magazine and chucking mechanism in timed relation comprising a magazine actuating cam, a chucking cam, a source of power, and periodically operable means for connecting said cams to said source of power.

14. In a machine tool, the combination of a feed magazine for feeding articles successively to a working position; chucking mechanism at said working position for receiving said articles, and means for actuating said magazine and chucking mechanism in timed relation including an endless timing element of adjustable length and means for driving said element.

15. In a machine tool, the combination of a feed magazine for feeding articles successively to a working position; chucking mechanism at said working position for receiving said articles, and means for actuating said magazine and chucking mechanism in timed relation including an endless timing element, a dog carried by said timing element, and clutch mechanism actuable by said dog.

16. In a machine tool having a feed magazine and means for periodically advancing said magazine, the combination in said magazine of a plurality of clips secured thereto in spaced relation for supporting articles, and means controlled in accordance with said magazine advance for forcibly ejecting articles from said clips.

17. In a machine tool having a feed magazine and means for periodically advancing said magazine, the combination in said magazine of a plurality of article supporting clips secured thereto in spaced relation, each of said clips comprising a relatively rigid finger, and a spring element positioned to engage an article and urge it against said finger, and means disposed in the path of advance of said magazine for forcibly ejecting articles from said clips.

HAROLD I. DYER.
OSCAR J. W. HEDLUND.